(12) United States Patent
You et al.

(10) Patent No.: US 9,424,803 B2
(45) Date of Patent: Aug. 23, 2016

(54) LIQUID CRYSTAL DISPLAY PANEL AND METHOD OF DRIVING THE SAME

(71) Applicant: Shanghai Tianma Micro-Electronics Co., Ltd., Shanghai (CN)

(72) Inventors: Shuai You, Shanghai (CN); Hong Li, Shanghai (CN); Jun Ma, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 188 days.

(21) Appl. No.: 13/951,355

(22) Filed: Jul. 25, 2013

(65) Prior Publication Data

US 2013/0307883 A1 Nov. 21, 2013

Related U.S. Application Data

(63) Continuation of application No. PCT/CN2012/078225, filed on Jul. 5, 2012.

(30) Foreign Application Priority Data

Dec. 29, 2011 (CN) .......................... 2011 1 0453546

(51) Int. Cl.
*G09G 5/10* (2006.01)
*G06F 3/038* (2013.01)
*G09G 5/00* (2006.01)
*G09G 3/36* (2006.01)
*G09G 5/02* (2006.01)
*G02F 1/1343* (2006.01)
(Continued)

(52) U.S. Cl.
CPC .......... *G09G 5/026* (2013.01); *G02F 1/134336* (2013.01); *G09G 3/3607* (2013.01); *G09G 3/3648* (2013.01); *G02F 2001/133622* (2013.01); *G02F 2001/134345* (2013.01); *G09G 3/3413* (2013.01); *G09G 2310/0235* (2013.01); *G09G 2320/0252* (2013.01)

(58) Field of Classification Search
CPC ............ G09G 2360/16; G09G 3/3233; G09G 3/3648; G09G 2300/0819
See application file for complete search history.

(56) References Cited

U.S. PATENT DOCUMENTS 5,457,552 A * 10/1995 Ogurtsov et al. ............... 349/54
2002/0113761 A1 8/2002 Mizutani et al.
(Continued)

FOREIGN PATENT DOCUMENTS

CN 1402556 A 3/2003
CN 101140749 A 3/2008
(Continued)

OTHER PUBLICATIONS

Extended European Search Report for European Application No. 12850742.3, mailed on Jun. 26, 2015, 8 pages total.

*Primary Examiner* — Alexander Eisen
*Assistant Examiner* — Nan-Ying Yang
(74) *Attorney, Agent, or Firm* — Alston & Bird LLP

(57) ABSTRACT

A liquid-crystal display (LCD) panel is disclosed. The LCD panel includes a plurality of pixel units arranged in a matrix, each pixel unit including at least two adjacent pixel sub-units. The LCD panel also includes a plurality of scan lines and a plurality of data lines, each pixel sub-unit being connected to one scan line and to one data line. The LCD panel also includes a driving circuit connected with the scan lines and the data lines, where the driving circuit is configured to drive each of the pixel sub-units via the scan lines and the data lines.

14 Claims, 3 Drawing Sheets

(51) Int. Cl.
*G02F 1/1335* (2006.01)
*G09G 3/34* (2006.01)

(56) References Cited

U.S. PATENT DOCUMENTS

2003/0025664 A1* 2/2003 Koga et al. ............... 345/89
2005/0052389 A1   3/2005 Sawabe
2005/0275777 A1* 12/2005 Oizumi et al. ............ 349/114
2007/0008263 A1*  1/2007 Kim ........................... 345/87
2009/0128467 A1*  5/2009 Chen .......................... 345/87
2010/0149227 A1*  6/2010 Tomizawa et al. ........ 345/694

FOREIGN PATENT DOCUMENTS

| CN | 101546543 A | 9/2009 |
| EP | 1892696 A1 | 2/2008 |

* cited by examiner

LIQUID CRYSTAL DISPLAY PANEL AND METHOD OF DRIVING THE SAME

CROSS-REFERENCES TO RELATED APPLICATIONS

This application claims priority to and is a continuation of International Patent Application PCT/CN2012/078225, titled "LIQUID CRYSTAL DISPLAY PANEL AND METHOD OF DRIVING THE SAME," filed on Jul. 5, 2012, which claims priority to Chinese patent application No. 201110453546.9, entitled "LIQUID CRYSTAL DISPLAY PANEL AND METHOD OF DRIVING THE SAME" and filed with the State Intellectual Property Office on Dec. 29, 2011, the contents of which are incorporated herein by reference in their entirety.

FIELD OF THE INVENTION

The invention relates to a display device and a method of driving the same, and in particular to a liquid crystal display (LCD) panel with shortened liquid crystal response time, and a method of driving the same.

BACKGROUND OF THE INVENTION

Field-sequential Color Liquid Crystal Display (FSC-LCD) devices have many advantages. A three-color (e.g., red, green and blue (R, G, B)) backlight source is driven to illuminate a whole panel in a particular timing in the display device. As a result, three colors of light, e.g., red, green and blue (R, G, B) light, are emitted sequentially from each pixel unit. The light is received by the eyes of a human and mixed through an afterimage effect, so that it appears that the pixel unit illuminates continuously in the eyes of the human. Compared with other existing LCD devices, the field-sequential LCD device does not need expensive color filters, thus cost is greatly reduced. Moreover, there is no need to divide the pixel unit into three or four pixel sub-units in the field-sequential LCD device, thus a higher resolution is achieved. The field-sequential LCD device does not need a color filter which strongly absorbs the light, therefore the utilization of the backlight and the brightness of the display can be greatly improved and power consumption can be reduced.

FIG. 1 is a structural diagram of a cross section of a field-sequential LCD pixel unit. The field-sequential LCD pixel unit of FIG. 1 includes: an upper substrate 10; a lower substrate 15; a liquid crystal layer 18 between the upper substrate 10 and the lower substrate 15; and a backlight source 19 having three colors of R, G, B which is located at a side of the lower substrate 15 opposite the upper substrate 10. A common electrode 12 is provided on the upper substrate 10, and a pixel electrode 16 is provided on the lower substrate 15. A black matrix 11 is formed in a partial region between the upper substrate 10 and the common electrode 12, and the black matrix 11 is used for shielding light from the region of the lower substrate 15 outside the region of the pixel electrode 16. A thin film transistor 17 is formed at a position on the lower substrate 15 corresponding to the black matrix 11 on the upper substrate 10. The thin film transistor 17 is electrically connected with the pixel electrode 16 and serves as a switching element of the pixel electrode 16.

FIG. 2 is a structural diagram of a field-sequential LCD panel. The LCD panel of FIG. 2 includes: a plurality of horizontal scan lines 22, with each scan line 22 being connected with gates of thin film transistors 23 of a whole row of pixel units 24; and a plurality of vertical data lines 21, with each data line 21 being connected with sources of thin film transistors 23 of a whole column of pixel units 24. A driving circuit sends triggering signals in sequence via the scan lines 22 so that the thin film transistors 23 of the pixel units 24 are turned on and the pixel units 24 receive image data sent from the data lines 21.

FIG. 3 is a timing diagram of a driving method of a field-sequential LCD panel. The driving method includes scanning, according to the corresponding R, G, and B light, all the thin film transistors with the scan lines. As a result of the scanning, image data sent from the corresponding data lines is received by the pixel electrode while the thin film transistor is turned on. The driving method also includes charging and discharging a capacitor in each pixel unit, so that liquid crystal molecules in a liquid crystal layer are rearranged, and making the pixel unit emit corresponding light by utilizing a backlight source. The period 34 to display light of one color includes: scanning time 31 to complete scanning all the thin-film transistors of the entire display panel, liquid crystal response time 32, and backlight irradiation time 33. To display an image frame, the field-sequential LCD device displays three colors in sequence, the thin film transistors are scanned three times, and the liquid crystal molecules in the liquid crystal layer are rearranged three times. Therefore, the actual light emitting time of the pixel unit is only a portion of the entire time.

For the field-sequential LCD panel or other LCD panels (such as TN-LCD, IPS-LCD, FFS-LCD and VA-LCD), when displaying a plurality of image frames, the grayscale of the same pixel will change. The smaller the change in the grayscale of the pixel, the longer the liquid crystal response time. The larger the change in the grayscale of the pixel, the shorter the liquid crystal response time. If the change in the grayscale of the pixel is very small (such as from grayscale 1 to grayscale 2), the liquid crystal response time of the pixel will be long. This is disadvantageous for the field-sequential LCD panel etc. which requires a high refresh rate and a short liquid crystal response time.

BRIEF SUMMARY OF THE INVENTION

One embodiment is a liquid-crystal display (LCD) panel. The LCD panel includes a plurality of pixel units arranged in a matrix, each pixel unit including at least two adjacent pixel sub-units. The LCD panel also includes a plurality of scan lines and a plurality of data lines, each pixel sub-unit being connected to one scan line and to one data line. The LCD panel also includes a driving circuit connected with the scan lines and the data lines, where the driving circuit is configured to drive each of the pixel sub-units via the scan lines and the data lines.

DETAILED DESCRIPTION OF THE INVENTION

Figure 1:
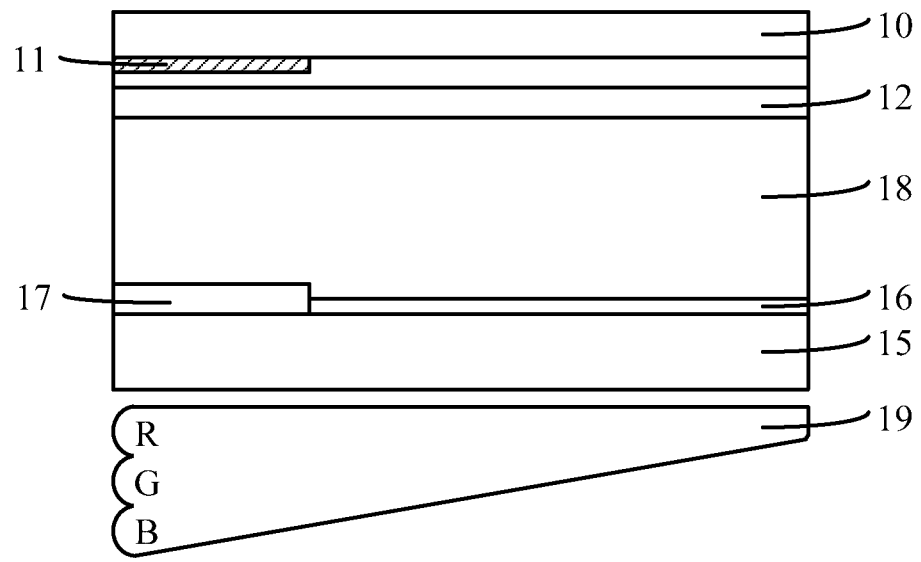
FIG. 1 is a structural diagram of a cross section of a field-sequential LCD pixel unit.
Figure 2:
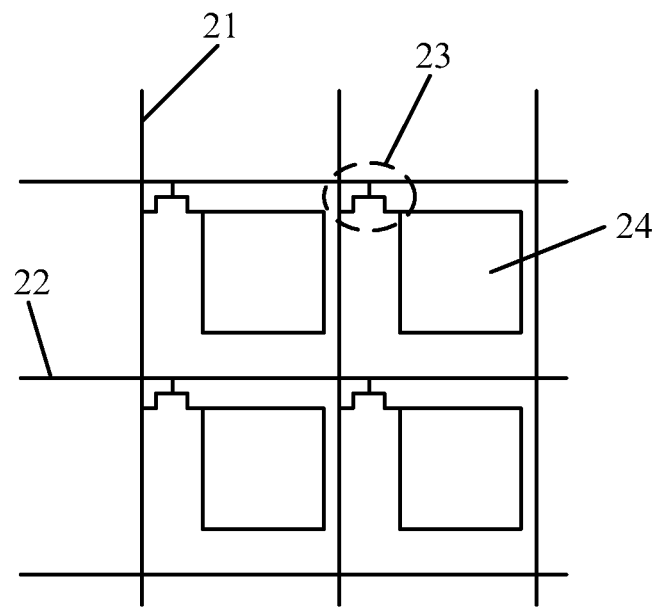
FIG. 2 is a structural diagram of a field-sequential LCD panel.
Figure 3:
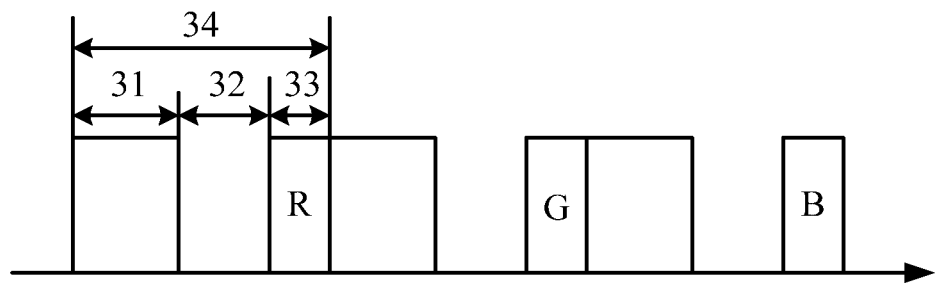
FIG. 3 is a timing diagram of a method of driving a field-sequential LCD panel.

As mentioned in the background, the existing LCD panel usually has a long liquid crystal response time when a change of a grayscale value of a pixel is small. The field-sequential LCD panel displays an image in a way that thin film transistors are each scanned three times and liquid crystal molecules in the liquid crystal layer are rearranged three times correspondingly. Because the rearranging of liquid crystal molecules occupies a lot of time, backlight irradiation time for image display is reduced. If the liquid crystal response time can be shortened, then the time saved can be used to extend the backlight irradiation time, which can improve display quality of an image and achieve a display image with high contrast and high brightness.

Taking a field-sequential LCD panel as an example, in a process of displaying an image, red, green, and blue light emitted from the same pixel unit have different grayscales. While a pixel unit is irradiated by light with the colors, grayscale values of the pixel unit are changed. In response to the changed grayscale values, the pixel unit twists liquid crystal molecules in a liquid crystal layer. The twisting speed and twisting angle are governed by a voltage applied between a pixel electrode and a common electrode. If the grayscale value changes from the maximum value to the minimum value or from the minimum value to the maximum value, the twisting angle of the liquid crystal molecule is the largest, and the voltage applied between the pixel electrode and the common electrode is also the largest. In such situations, the liquid crystal response time is the shortest since the twisting speed of the liquid crystal molecular is the greatest. In the case where the changing of the grayscale value is smaller, the twisting angel of the liquid crystal molecular is smaller. The voltage applied between the pixel electrode and the common electrode is also smaller, and the twisting speed of the liquid crystal molecule is lower, leading to a longer liquid crystal response time. Therefore, the absolute value of the change in the grayscale value of the pixel unit should be as large as possible, so that the liquid crystal response time is shorter and the backlight irradiation time is longer, which can improve display quality of an image and achieve a display image with high contrast and high brightness.

An LCD panel may include a plurality of pixel units arranged in a matrix, with each pixel unit including at least two adjacent pixel sub-units. The LCD panel may also include a plurality of scan lines and a plurality of data lines, with each pixel sub-unit being connected to one scan line and to one data line. The LCD panel may also include a driving circuit connected with the scan lines and the data lines. The driving circuit drives each of the pixel sub-units via the scan lines and the data lines. By changing the grayscale value of at least one of the pixel sub-units, the grayscale value of a corresponding pixel unit changes, where the absolute value of the change in the grayscale value of the changed pixel sub-unit is greater than or equal to the absolute value of the change in the grayscale value of the pixel unit. As a result, the liquid crystal response time of the pixel sub-unit is less than or equal to the liquid crystal response time of the pixel unit, thus leaving a longer time for backlight irradiation in the whole process of displaying an image on the liquid display panel.

Certain embodiments of the invention are described below in detail in conjunction with drawings.

Figure 4:
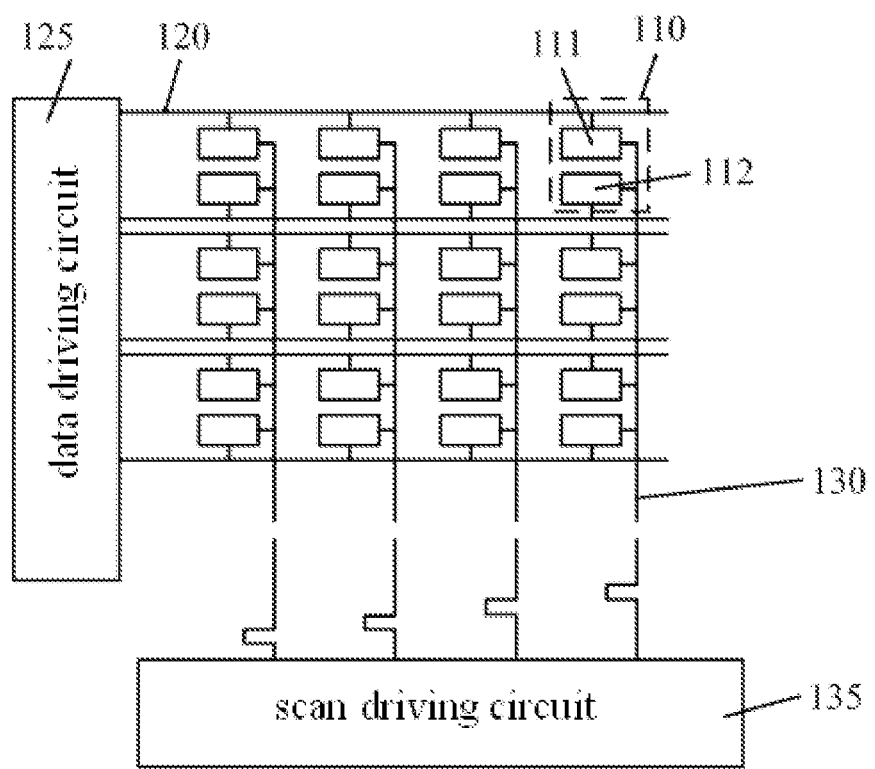
FIG. 4 is a structural diagram of a LCD panel according to an embodiment of the invention.

An LCD panel is provided in an embodiment of the invention. With reference to FIG. 4, which is a structural diagram of the LCD panel of the embodiment of the invention. The LCD panel includes a plurality of pixel units 110 arranged in a matrix, in which each pixel unit 110 includes a first pixel sub-unit 111 and a second pixel sub-unit 112 adjacent to the first pixel sub-unit 111. Each of the first pixel sub-unit 111 and the second pixel sub-unit 112 is connected with a thin film transistor (not shown). The drain of the thin film transistor is connected with a capacitor for charging the pixel electrode (not shown), and the capacitor includes a storage capacitor (not shown) and a liquid crystal capacitor (not shown). The LCD panel also includes a plurality of data lines 120 arranged horizontally. The source of the thin film transistor of each pixel sub-unit is connected with one data line 120. The LCD panel also includes a plurality of scan lines 130 arranged vertically. The gate of the thin film transistor of each pixel sub-unit is connected with one scan line 130. The data line 120 which is connected with the first pixel sub-unit 111 is located at one side of the first pixel sub-unit 111, and the data line 120 which is connected with the second pixel sub-unit 112 is located at one side of the second pixel sub-unit 112 opposite the first pixel sub-unit 111. In this embodiment, the data line 120 connected with the first pixel sub-unit 111 and the data line 120 connected with the second pixel sub-unit 112 are located at the opposite sides of the pixel unit 110 respectively. The pixel unit 110 includes the first pixel sub-unit 111 and the second pixel sub-unit 112, and is located in a region surrounded by two adjacent data lines 120 and two adjacent scan lines 130. The LCD panel also includes a scan driving circuit 135 connected with each of the scan lines 130, and configured to control the switching state of the thin film transistors corresponding to the pixel sub-units. The LCD panel also includes a data driving circuit 125 connected with each of the data lines 120, and configured to transfer image data to the pixel sub-units.

In this embodiment, the LCD panel may be a field-sequential LCD panel. Accordingly, the first pixel sub-unit and the second pixel sub-unit display in a field-sequential driving mode. The specific structure of the pixel sub-unit of the LCD panel according to the embodiment of the invention is not limited. Since the LCD panel is a field-sequential LCD panel, the LCD panel further includes a backlight unit which can provide, for example, a red light source, a green light source and a blue light source, so that the LCD panel becomes a color LCD panel. In a process of displaying an image, since the backlight unit can provide only one color of light at a time, the first pixel sub-unit displays a color the same as the color displayed by the second pixel sub-unit. In other embodiments, the LCD panel may be a TN-LCD, an IPS-LCD, a FFS-LCD or a VA-LCD.

The LCD panel in the embodiment of the invention may be a monochrome LCD panel, or may be a color LCD panel. If the LCD panel in the embodiment of the invention is a color LCD panel, then the pixel sub-units in the same pixel unit display the same color. When the color LCD panel is not a field-sequential LCD panel, for example, in the case where a pixel includes an R sub-pixel, a G sub-pixel and a B sub-pixel, then the R sub-pixel includes a first R sub-pixel and a second R sub-pixel; the G sub-pixel includes a first G sub-pixel and a second G sub-pixel; and the B sub-pixel includes a first B sub-pixel and a second B sub-pixel.

In this embodiment, the first pixel sub-units 111 and the second pixel sub-units 112 are alternately arranged in the vertical direction, and the first pixel sub-unit and the second pixel sub-unit which are adjacent in the vertical direction are part of one pixel unit. The first pixel sub-unit 111 and the second pixel sub-unit 112 in the same pixel unit 110 are connected to the same scan line 130, so that the switching state of the thin film transistors of the first pixel sub-unit 111 and the second pixel sub-unit 112 are controlled simultaneously, and the changing of the grayscale value of the first pixel sub-unit 111 and the second pixel sub-unit 112 are performed at the same time. In other embodiments, the first pixel sub-units and the second pixel sub-units are alternately arranged in the horizontal direction, the first pixel sub-unit and the second pixel sub-unit which are adjacent in the horizontal direction part of one pixel unit, and the first pixel sub-unit and the second pixel sub-unit in the same pixel unit are connected to the same data line.

The area of the first pixel sub-unit 111 and the area of the second pixel sub-unit 112 are the same. The first pixel sub-unit 111 and the second pixel sub-unit 112 both are rectangular. The shape of the pixel unit 110 comprising the first pixel sub-unit 111 and the second pixel sub-unit 112 is substantially square. In another embodiment, the area of the first pixel sub-unit and the area of the second pixel sub-unit adjacent to each other may be different. The difference can be determined through design. The shape of the pixel unit comprising a first pixel sub-unit and a second pixel sub-unit may be substantially square. In other embodiments, the pixel unit may include three or more pixel sub-units, in which each of the pixel sub-units is independently connected with the driving circuit via a scan line and a data line, and the areas of the pixel sub-units may be same or different, and the shape of the pixel unit composed of the three or more pixel sub-units may be substantially square.

In this embodiment, the data line 120 that is connected with the first pixel sub-unit 111 is located at one side of the first pixel sub-unit 111, and the data line 120 that is connected with the second pixel sub-unit 112 is located at one side of the second pixel sub-unit 112 opposite to the first pixel sub-unit 111. In this embodiment, the data line 120 connected with the first pixel sub-unit 111 and the data line 120 connected with the second pixel sub-unit 112 are located at the opposite sides of the pixel unit 110 respectively, so that there is one pixel unit 110 in a region surrounded by corresponding two adjacent data lines 120 and two adjacent scan lines 130.

Figure 5:
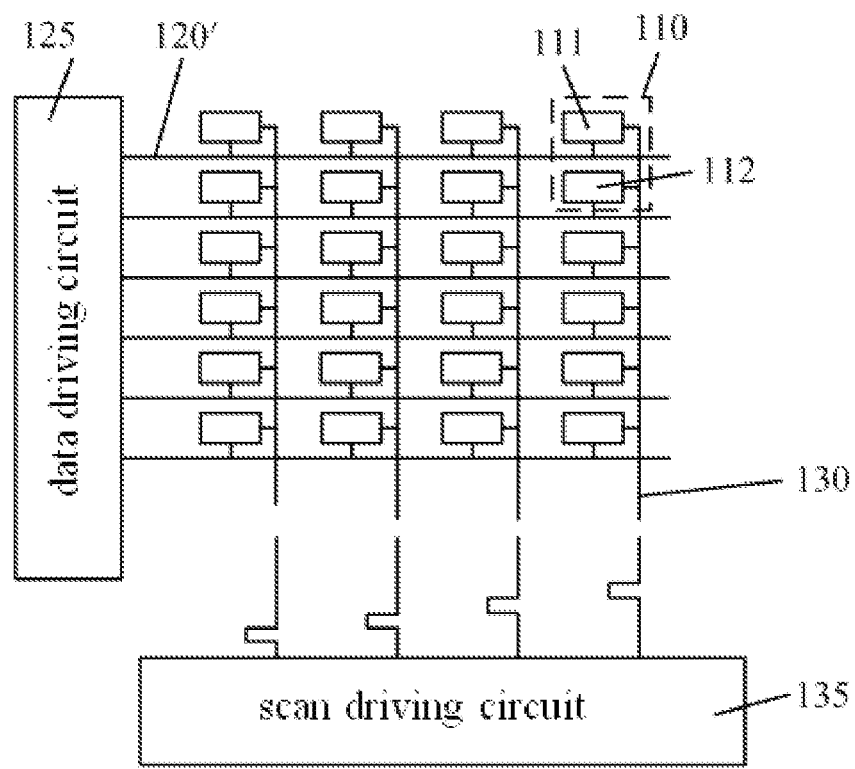
FIG. 5 is a structural diagram of a LCD panel according to another embodiment of the invention.

In another embodiment, referring to FIG. 5, a data line 120' connected with a first pixel sub-unit 111 is located at a side of the first pixel sub-units 111, and a data line 120' connected with a second pixel sub-unit 112 is located on the same side of the second pixel sub-unit 112 respectively, so that there is one pixel sub-unit in a region surrounding by two adjacent data lines 120' and two adjacent scan lines 130.

In the embodiment shown in FIG. 5, the first pixel sub-units 111 and the second pixel sub-units 112 are alternately arranged in the vertical direction. The first pixel sub-unit 111 and the second pixel sub-unit 112 which are adjacent to each other in the vertical direction constitute one pixel unit 110. The first pixel sub-unit 111 and the second pixel sub-unit 112 in the same pixel unit 110 are connected with the same scan line 130. Accordingly, the switching state of thin film transistors of the first pixel sub-unit 111 and the second pixel sub-unit 112 are simultaneously controlled, and the changing of the grayscale value of the first pixel sub-unit 111 and the second pixel sub-unit 112 are performed at the same time. In other embodiments, the first pixel sub-units and the second pixel sub-units are alternately arranged in the horizontal direction. The first pixel sub-unit and the second pixel sub-unit which are adjacent in the horizontal direction constitute one pixel unit, and the first pixel sub-unit and the second pixel sub-unit are connected with the same data line.

In this embodiment, a data driving circuit 125 and a scan driving circuit 135 are provided separately and are connected with the data lines 120 and the scan lines 130 respectively, for driving each of the pixel sub-units in the LCD panel respectively. In other embodiments, the data driving circuit and the scan driving circuit may be integrated in the same driving circuit. Accordingly, the driving circuit may be connected with the data lines and the scan lines for driving each of the pixel sub-units in the LCD panel unit.

In the embodiment, when the scan driving circuit 135 sends a trigger signal to each of the pixel sub-units via the scan lines 130, the trigger signals are sent line by line from the leftmost scan line to the rightmost scan line. In other embodiments, the trigger signals are sent line by line from the rightmost scan line to the leftmost scan line. When the trigger signal is transferred to the gates of the thin film transistors of corresponding first pixel sub-unit 111 and second pixel sub-unit 112, the corresponding thin film transistors are turned on, and image data is transferred by the data driving circuit 125 to the sources of the thin film transistors of the corresponding pixel sub-units via the plurality of data lines 120. The image data is then transferred to the capacitors (including the storage capacitor and the liquid crystal capacitor) that are connected with the drains of the thin film transistors, so that the capacitors are charged according to the image data. As a result, the grayscale values of the pixel units (i.e., the grayscale values of the image displayed by the pixel sub-units) are controlled.

In order to obtain a shorter liquid crystal response time in the LCD panel of the embodiment of the invention, the absolute value of the change in the grayscale value of the pixel unit between two adjacent frames of image should be larger.

In the following, a method of driving a LCD panel is illustrated in detail by taking a 64-grayscale LCD panel as an example.

The LCD panel data has 64 grayscales, which indicates that each pixel unit can display 64 brightness levels, and that both of the first pixel sub-unit and the second pixel sub-unit are able to display 64 brightness levels. The corresponding grayscale values are 0–63. The relationship between the relative brightness and the corresponding grayscale value of the pixel unit is:

$$L=(N/\text{maximum total number of grayscale levels})^{\text{gamma coefficient}} \quad (1)$$

Where L is relative brightness of the pixel unit and N is corresponding grayscale value of the pixel unit. The maximum grayscale value is equal to a value of the total number of grayscale levels of the LCD panel minus 1. In this embodiment, the total number of grayscale levels is 64, therefore the maximum grayscale value is 63. In other embodiments, in the case where the total number of grayscale levels is $2^H$ and H is greater than or equal to 4, the maximum grayscale value is ($2^H-1$). Since the gamma coefficient commonly used in a display device is often 2.2, the gamma coefficient is 2.2 in this embodiment.

Since the pixel unit includes one first pixel sub-unit and one second pixel sub-unit, the weighted average of the brightness of the light emitted from the first pixel sub-unit and the second pixel sub-unit is the brightness of the pixel unit, namely:

$$L=L1*X+L2*Y \quad (2)$$

Where L is the relative brightness of the pixel unit, L1 is relative brightness of the first pixel sub-unit, L2 is relative brightness of the second pixel sub-unit, X is a percentage of the area of the first pixel sub-unit relative to the total area of all pixel sub-units in a pixel unit, Y is a percentage of the area of the second pixel sub-unit relative to the total area of all pixel sub-units in a pixel unit, and X+Y=100%.

The formula (1) is substituted into the formula (2). For the same image frame, a relationship between the grayscale value of the pixel unit and the grayscale values of the first pixel sub-unit and the second pixel sub-unit is obtained according to the formula (1) and the formula (2), namely:

$$(N/\text{maximum total number of grayscale levels})^{\text{gamma coefficient}}=((n1/\text{maximum total number of grayscale levels})^{\text{gamma coefficient}})*X+((n2/\text{maximum total number of grayscale levels})^{\text{gamma coefficient}})*Y \quad (3)$$

Where N is grayscale value of the pixel unit, n1 is grayscale value of the first pixel sub-unit, and n2 is grayscale value of the second pixel sub-unit.

In this embodiment, the area of the first pixel sub-unit can be equal to the area of the second pixel sub-unit, X=Y=0.5.

The relationship between the grayscale value of the pixel unit and the grayscale values of the first pixel sub-unit and the second pixel sub-unit is:

$$(N/\text{maximum total number of grayscale levels})\hat{}\text{gamma coefficient} = ((n1/\text{maximum total number of grayscale levels})\hat{}\text{gamma coefficient})*0.5 + ((n2/\text{maximum total number of grayscale levels})\hat{}\text{gamma coefficient})*0.5 \quad (4)$$

According to the relationship in the formula (3), the grayscale value of the pixel unit can be changed by changing the grayscale value of at least one of the pixel sub-units. Moreover, the liquid crystal response time can be shortened by controlling the absolute value of the change in the changed pixel sub-unit to be greater than or equal to the grayscale value of the change in the pixel unit, thus a longer actual light emitting time of the pixel unit can be obtained, and the display quality of an image can be improved.

In other embodiments, in the case where a pixel unit includes at least three pixel sub-units, since brightness of the pixel unit is the weighted average of the brightness of the at least three sub-pixels, a grayscale value of the pixel unit can be changed by changing a grayscale value of at least one pixel sub-unit in the pixel unit and liquid crystal response time can be shortened by controlling the absolute value of the change in the pixel sub-unit to be greater than or equal to the grayscale value of the change in the pixel unit. Thus, a longer actual light emitting time of the pixel unit can be obtained, and the display quality of an image can be improved.

An embodiment of the invention provides a method of driving the LCD panel shown in FIG. 4. The method includes: when displaying adjacent frames of image, changing grayscale value of at least one of the first pixel sub-unit and the second pixel sub-unit so as to change the grayscale value of the pixel unit, wherein the absolute value of the change in the grayscale value of changed pixel sub-unit is greater than or equal to the absolute value of the change in the grayscale value of the pixel unit. For the sake of simplicity, in some embodiments, for each image frame, the grayscale value of one of the first pixel sub-unit and the second pixel sub-unit is a first grayscale value. Specifically, the following implementations can be adopted.

A first embodiment of the method of driving a LCD panel of the invention includes: when displaying adjacent image frames, fixing a grayscale value of one of a first pixel sub-unit and a second pixel sub-unit as a first grayscale value, and changing a grayscale value of the other pixel sub-unit so as to change a grayscale value of a pixel unit. For each image frame, the grayscale value of one of the first pixel sub-unit and the second pixel sub-unit is the first grayscale value. The relationship between the grayscale values of the first pixel sub-unit and the second sub-pixel and the grayscale value of the pixel unit including the pixel sub-unit and the second sub-pixel satisfies formula (3). The first grayscale value may be a maximum grayscale value or a minimum grayscale value, or other grayscale value may be approximately equal to the maximum grayscale value or the minimum grayscale value. For example, when displaying current image frame, the grayscale value of the first pixel sub-unit may be the first grayscale value, and the grayscale value of the second pixel sub-unit may be the first grayscale value or may not be the first grayscale value. When displaying a next image frame, the grayscale value of the first pixel sub-unit may still be the first grayscale value, and the grayscale value of the second pixel sub-unit is obtained according to the formula (3). Since the grayscale value of one pixel sub-unit in the same pixel unit is fixed to the first grayscale value, and the absolute value of the change in the grayscale value of the other pixel sub-unit is greater than or equal to the absolute value of the change in the grayscale value of the pixel unit, thus a liquid crystal response time of the pixel unit is shorter than the liquid crystal response time of the pixel unit of the prior art. Moreover, since there is no change in the grayscale value of one of the pixel sub-units, a response time is not needed for a liquid crystal layer, so that the liquid crystal response time of the pixel unit according to the embodiment of the invention is shorter than that of the pixel unit in the prior art. Accordingly, a longer backlight irradiation time is achieved. Therefore, display quality of an image can be improved and a display image with high contrast and high brightness is achieved.

For example, the maximum grayscale value may be 63, the minimum grayscale value may be 0, and the first grayscale value in the embodiment may be 0. In this embodiment, when displaying the current image frame, the grayscale value of the first pixel sub-unit is 0, the grayscale value of the second pixel sub-unit may be 0 or may not be 0; when displaying the next frame of image, the grayscale value of the pixel unit is changed by changing the grayscale value of the second pixel sub-unit. The grayscale value of the first pixel sub-unit, the grayscale value of the second pixel sub-unit and the grayscale value of the corresponding pixel unit can be made according to Table 1. In Table 1, the first row shows the single digit of the grayscale value of the pixel unit, the first column shows the tens digit of the grayscale value of the pixel unit, and for the data in the rest of the table, the numerical value in front of the comma denotes the grayscale value of the first pixel sub-unit, the numerical value after the comma denotes the grayscale value of the second pixel sub-unit. Since the grayscale value is an integer, the data in Table 1 is a rounded value calculated from formula (4). For example, when the grayscale value of the pixel unit needs to be changed from 06 to 43, the grayscale value of the first pixel sub-unit is fixed as 0, and the liquid crystal molecules do no need to be rearranged; the grayscale value of the second pixel sub-unit is changed from 8 to 59. Since the absolute value of the change in the grayscale value of the pixel unit is 37, and the absolute value of the change in the grayscale value of the second pixel sub-unit is 51, the liquid crystal response time of the second pixel sub-unit is shorter than the liquid crystal response time of the pixel unit in the prior art. Thus, the liquid crystal response time of the LCD panel in the embodiment of the invention is shorter than the liquid crystal response time of the pixel unit of the prior art.

TABLE 1

|   | 0 | 1 | 2 | 3 | 4 | 5 | 6 | 7 | 8 | 9 |
|---|---|---|---|---|---|---|---|---|---|---|
| 0 | 0, 0 | 0, 1 | 0, 3 | 0, 4 | 0, 6 | 0, 7 | 0, 8 | 0, 10 | 0, 11 | 0, 12 |
| 1 | 0, 13 | 0, 15 | 0, 16 | 0, 18 | 0, 19 | 0, 20 | 0, 22 | 0, 23 | 0, 25 | 0, 26 |
| 2 | 0, 27 | 0, 29 | 0, 30 | 0, 31 | 0, 33 | 0, 34 | 0, 36 | 0, 37 | 0, 38 | 0, 40 |
| 3 | 0, 41 | 0, 42 | 0, 43 | 0, 45 | 0, 47 | 0, 48 | 0, 49 | 0, 50 | 0, 52 | 0, 53 |
| 4 | 0, 55 | 0, 56 | 0, 57 | 0, 59 | 0, 60 | 0, 62 | 0, 63 | 47, 47 | 48, 48 | 49, 49 |
| 5 | 50, 50 | 51, 51 | 52, 52 | 53, 53 | 54, 54 | 55, 55 | 56, 56 | 57, 57 | 58, 58 | 59, 59 |
| 6 | 60, 60 | 61, 61 | 62, 62 | 63, 63 | | | | | | |

In the first embodiment, since the grayscale value of the pixel unit is 46, the grayscale value of the second pixel sub-unit has reached the maximum grayscale value, i.e. 63, therefore when the grayscale value of the pixel unit is in the range of 47~63, the grayscale value of the first pixel sub-unit and the grayscale value of the second pixel sub-unit are the same as that of the pixel unit. The absolute value of the change in the grayscale value of the first pixel sub-unit and the absolute value of the change in the grayscale value of the second pixel sub-unit are the same as the absolute value of the change in the grayscale value of the pixel unit, therefore the liquid crystal response time can not be shortened.

In view of this, in the second embodiment of the method of driving a LCD panel according to the invention, a low-grayscale image is displayed by utilizing a LCD panel which can display a high-grayscale image. For example, a LCD panel which can display a 64-grayscale image can be used to display a 32-grayscale image, the grayscale value of one of a first pixel sub-unit and a second pixel sub-unit is fixed to a first grayscale value, and the grayscale value of the pixel unit is changed by changing the grayscale value of the other pixel sub-unit. Referring to Table 1, when the maximum grayscale value of the image displayed by the pixel unit is 31, the grayscale value of the corresponding second pixel sub-unit is 42 (which does not exceed the grayscale range of the LCD panel), therefore, the liquid crystal response time can be shortened by any change of the grayscale value of the pixel unit.

A third embodiment of the method of driving a LCD panel according to the invention includes: when displaying adjacent frames of image, a grayscale value of a first pixel sub-unit and a grayscale value of a second pixel sub-unit are alternatively set to be a first grayscale value. For each image frame, the grayscale value of one of the first pixel sub-unit and the second pixel sub-unit is the first grayscale value. The relationship between the grayscale values of the first pixel sub-unit and the second pixel sub-unit and a grayscale value of a pixel unit satisfies the formula (3). For example, when displaying a current image frame, the grayscale value of the first pixel sub-unit is the first grayscale value, and the grayscale value of the second pixel sub-unit is calculated according to the formula (3), which may be or not be the first grayscale value. When displaying a next image frame, the grayscale value of the second pixel sub-unit is changed to the first grayscale value, and the grayscale value of the first pixel sub-unit is changed to a corresponding grayscale value which is calculated according to the formula (3), so that the grayscale value of the pixel unit changes. The first grayscale value may be the maximum grayscale value or the minimum grayscale value, or other grayscale value approximately equal to the maximum grayscale value or the minimum grayscale value. When the absolute value of the change of the grayscale value of the two pixel sub-units in the same pixel unit is greater than the absolute value of the change in the grayscale value of the pixel unit, the liquid crystal response time of the two pixel sub-units is shorter than the liquid crystal response time of the pixel unit in the prior art, so that the liquid crystal response time of the LCD panel according to the embodiment of the invention is shorter than the liquid crystal response time of the LCD panel of the prior art, leaving a longer backlight irradiation time. Therefore display quality of an image is improved and a display image with high contrast and high brightness is achieved.

Specifically, the maximum grayscale value is 63, the minimum grayscale value is 0, and the first grayscale value is 0 in the embodiment. In the embodiment, when displaying the current image frame, the grayscale value of the first pixel sub-unit is 0, the grayscale value of the second pixel sub-unit may be 0 or may not be 0. When displaying the next frame of image, the grayscale value of the second pixel sub-unit is changed from the original grayscale value to 0, and the grayscale value of the first pixel sub-unit is changed from 0 to a corresponding grayscale value which is calculated according to formula (4). For example, when the grayscale value of the corresponding pixel unit needs to be changed from 36 to 43, since the grayscale value of one of the pixel sub-units of the pixel unit 36 is 0, the grayscale value of the other pixel sub-unit of the pixel unit 36 is 49, and the grayscale value of one of the pixel sub-units of the pixel unit 43 is 0, and the grayscale value of the other pixel sub-unit of the pixel unit 43 is 59, then the grayscale value of one of the pixel sub-units is changed from 0 to 59, and the other pixel sub-unit is changed from 49 to 0. Since the absolute values of the change in the grayscale value of the two pixel sub-units are 59 and 49 respectively and the absolute value of the change in the grayscale value of the pixel unit is 7, the liquid crystal response time of the LCD panel in the embodiment of the invention is shorter than the liquid crystal response time of the LCD panel of the prior art, leaving a longer backlight irradiation time. Therefore the display quality of an image is improved and a display image with high contrast and high brightness is achieved.

When the first pixel sub-unit and the second pixel sub-unit are connected with the same scan line, the switching state of the thin film transistors of the first pixel sub-unit and the second pixel sub-unit can be controlled simultaneously. So that the changing of the grayscale value of the first pixel sub-unit can be performed at the same time as the changing of the grayscale value of the second pixel sub-unit, thus facilitating shortening of the liquid crystal response time.

In the third embodiment, when a grayscale value of a pixel unit is 46, a grayscale value of a second pixel sub-unit has reached the maximum grayscale value, i.e. 63, therefore, when the grayscale value of the pixel unit is in the range of 47~63, a grayscale value of a first pixel sub-unit and the grayscale value of the second pixel sub-unit are the same as the grayscale value of the pixel unit. An absolute value of the change in the grayscale values of the first pixel sub-unit and the absolute value of the change in the grayscale value of the second pixel sub-unit are the same as an absolute value of the grayscale value of the pixel unit, and this can not shorten the liquid crystal response time.

In view of this, in the fourth embodiment of a method of driving a LCD panel according to the invention, a low-grayscale image is displayed by utilizing a LCD panel which can display a high-grayscale image. For example, a LCD panel which can display a 64-grayscale image can be used to display a 32-grayscale image. The grayscale value of one of a first pixel sub-unit and a second pixel sub-unit is fixed to a first grayscale value, the grayscale value of the other pixel sub-unit is changed to the first grayscale, and the grayscale value of the pixel sub-unit that has the first grayscale value originally is changed to a corresponding grayscale value, so that a grayscale value of a pixel unit is changed. Referring to Table 1, since when maximum grayscale value of the image displayed by the pixel unit is 31, the grayscale value of the corresponding second pixel sub-unit is 42 (which does not exceed the grayscale range of the LCD panel), therefore, any change of the grayscale value of the pixel unit can shorten the liquid crystal response time.

In summary, each pixel unit of the LCD panel according to the embodiments of the invention includes at least two adjacent pixel sub-units, and each of the pixel sub-units can be independently controlled by a driving circuit. A grayscale value of at least one of the at least two adjacent pixel sub-units changes so that a grayscale value of the pixel unit changes. Where an absolute value of the change in the grayscale value of changed pixel sub-unit is greater than or equal to an absolute value of the change in the grayscale value of the pixel unit. The amount of change in the grayscale value of the pixel sub-unit of the pixel unit is greater than the amount of change in the grayscale value of the pixel unit. Thus, the liquid crystal response time of the pixel unit is shortened. The time saved can be used to extend backlight irradiation time, thus display quality of an image is improved and a display image with high contrast and high brightness is achieved. The amount of change in the grayscale value of the pixel sub-unit of the pixel unit can be large even if the amount of change in the grayscale of the pixel unit in the adjacent frames of image is small, which will lead to a short liquid crystal response time.

Although the invention has been described above in conjunction with certain embodiments, the description is not intended to limit the invention. Any possible variations and modifications can be made to the technical solution of the invention by those skilled in the art using the method and technical content described above without departing from the spirit and scope of the invention. Therefore, any variations, equivalents and modifications made to the embodiments in accordance with the technical essence of the invention fall within the scope of protection of the technical solution of the invention.

What is claimed is:

1. A liquid-crystal display (LCD) panel, comprising:
    a plurality of pixel units arranged in a matrix, each pixel unit comprising at least two adjacent pixel sub-units;
    a plurality of scan lines and a plurality of data lines, each pixel sub-unit being connected to one scan line and to one data line; and
    a driving circuit connected with the scan lines and the data lines, wherein the driving circuit is configured to drive each of the pixel sub-units via the scan lines and the data lines such that the grayscale value of at least one of the at least two adjacent pixel sub-units is fixed during adjacent image frames, and
    the LCD panel is a field-sequential LCD panel and comprises a backlight unit adapted to provide colors of light, wherein the pixel unit comprises a first pixel sub-unit and a second pixel sub-unit adjacent to the first pixel sub-unit, wherein for the same image frame, a relationship between a grayscale value of the pixel unit and grayscale values of the first pixel sub-unit and the second pixel sub-unit is:

$(N/\text{maximum total number of grayscale levels})^{\text{gamma coefficient}} = ((n1/\text{maximum total number of grayscale levels})^{\text{gamma coefficient}}) * X + ((n2/\text{maximum total number of grayscale levels})^{\text{gamma coefficient}}) * Y,$ wherein N is a grayscale value of the pixel unit, n1 is a grayscale value of the first pixel sub-unit, n2 is a grayscale value of the second pixel sub-unit, X is a percentage of the area of the first pixel sub-unit relative to the total area of the first pixel sub-unit and the second pixel sub-unit, and Y is a percentage of the area of the second pixel sub-unit relative to the total area of the first pixel sub-unit and the second pixel sub-unit.

2. The LCD panel according to claim 1, wherein the area of the first pixel sub-unit is same as the area of the second pixel sub-unit.

3. The LCD panel according to claim 1, wherein the LCD panel is a monochrome LCD panel.

4. The LCD panel according to claim 1, the backlight unit being adapted to provide a red light source, a green light source and a blue light source.

5. The LCD panel according to claim 1, wherein during the adjacent image frames, when the grayscale value of the pixel unit changes, the grayscale value of at least one of the first pixel sub-unit and the second pixel sub-unit changes, and the absolute value of the change in the grayscale value of one of the first pixel sub-unit and the second pixel sub-unit is greater than or equal to the absolute value of the change in the grayscale value of the pixel unit.

6. The LCD panel according to claim 5, wherein for the same image frame, the grayscale value of one of the first pixel sub-unit and the second pixel sub-unit is a first grayscale value.

7. The LCD panel according to claim 6, wherein during the adjacent image frames, the grayscale value of one of the first pixel sub-unit and the second pixel sub-unit is fixed to the first grayscale value.

8. The LCD panel according to claim 6, wherein during the adjacent image frames, the grayscale value of the first pixel sub-unit and the grayscale value of the second pixel sub-unit are alternatively set to be the first grayscale value.

9. The LCD panel according to claim 6 wherein the first grayscale value is a maximum grayscale value or a minimum grayscale value.

10. A method of driving the LCD panel according to claim 1 comprising:
    when displaying the adjacent image frames, changing the grayscale value of at least one of the at least two adjacent pixel sub-units so that the grayscale value of the pixel unit changes, wherein the absolute value of the change in the grayscale value of the changed pixel sub-unit is greater than or equal to the absolute value of the change in the grayscale value of the pixel unit.

11. The method of driving the LCD panel according to claim 10, wherein the pixel unit comprises a first pixel sub-unit and a second pixel sub-unit adjacent to the first pixel sub-unit, and wherein when displaying the same frame of image, a relationship between the grayscale value of the pixel unit and the grayscales of the first pixel sub-unit and the second pixel sub-unit is:

$(N/\text{maximum total number of grayscale levels})^{\text{gamma coefficient}} = ((n1/\text{maximum total number of grayscale levels})^{\text{gamma coefficient}}) * X + ((n2/\text{maximum total number of grayscale levels})^{\text{gamma coefficient}}) * Y,$ wherein N is a grayscale value of the pixel unit, n1 is a grayscale value of the first pixel sub-unit, n2 is a grayscale value of the second pixel sub-unit, X is a percentage of the area of the first pixel sub-unit relative to the total area of the first pixel sub-unit and the second pixel sub-unit, and Y is a percentage of the area of the second pixel sub-unit relative to the total area of the first pixel sub-unit and the second pixel sub-unit.

12. The method of driving the LCD panel according to claim 11, wherein the area of the first pixel sub-unit is same as the area of the second pixel sub-unit, and when displaying the same image frame, a relationship between the grayscale value of the pixel unit and the grayscale values of the first pixel sub-unit and the second pixel sub-unit is:

$(N/\text{maximum total number of grayscale levels})^{\text{gamma coefficient}} = ((n1/\text{maximum total number of grayscale levels})^{\text{gamma coefficient}}) * 0.5 + ((n2/\text{maximum total number of grayscale levels})^{\text{gamma coefficient}}) * 0.5,$ wherein N is a grayscale value of the pixel unit, n1 is a grayscale value of the first pixel sub-unit, and n2 is a grayscale value of the second pixel sub-unit.

13. The method of driving the LCD panel according to claim 11, wherein when displaying the adjacent image frames, the grayscale value of one of the first pixel sub-unit and the second pixel sub-unit is fixed to a first grayscale value, and the grayscale value of the other pixel sub-unit changes so as to change the grayscale value of the pixel unit.

14. The method of driving the LCD panel according to claim 13, wherein the first grayscale value is a maximum grayscale value or a minimum grayscale value.

* * * * *